United States Patent [19]
Bitterice

[11] 3,947,837
[45] Mar. 30, 1976

[54] SECURITY GLAZING AND ALARM SYSTEM

[75] Inventor: Michael G. Bitterice, New Kensington, Pa.

[73] Assignee: PPG Industries, Inc., Pittsburgh, Pa.

[22] Filed: Aug. 7, 1974

[21] Appl. No.: 495,469

[52] U.S. Cl............ 340/274 R; 340/256; 340/285; 200/61.84; 200/61.93
[51] Int. Cl.² ........................................ G08B 13/00
[58] Field of Search .......... 340/273, 274, 276, 256, 340/259, 258 R, 285; 200/61.62, 61.08, 61.84, 61.93; 161/196, 213

[56] References Cited
UNITED STATES PATENTS

| | | | |
|---|---|---|---|
| 2,423,649 | 7/1947 | Horvitch | 340/276 |
| 3,388,032 | 6/1968 | Saunders | 161/183 |
| 3,594,770 | 7/1971 | Ham | 340/273 |
| 3,623,061 | 11/1971 | Mayhew et al. | 340/273 |
| 3,696,373 | 10/1972 | Dunn et al. | 340/273 |
| 3,721,594 | 3/1973 | Tarnopol et al. | 161/196 X |

Primary Examiner—John W. Caldwell
Assistant Examiner—William M. Wannisky
Attorney, Agent, or Firm—Dennis G. Millman

[57] ABSTRACT

A glazing unit having a plurality of plies is provided with a grid of fine wires electrically connected in parallel. A warning signal is activated upon a change in the resistance of the grid. The arrangement permits resetting the alarm after a partial break in the grid. A second grid may be used as the reference resistance in the alarm circuitry. Thermally induced breakage of the fine wires is avoided by providing resilient connections to the bus bars.

15 Claims, 9 Drawing Figures

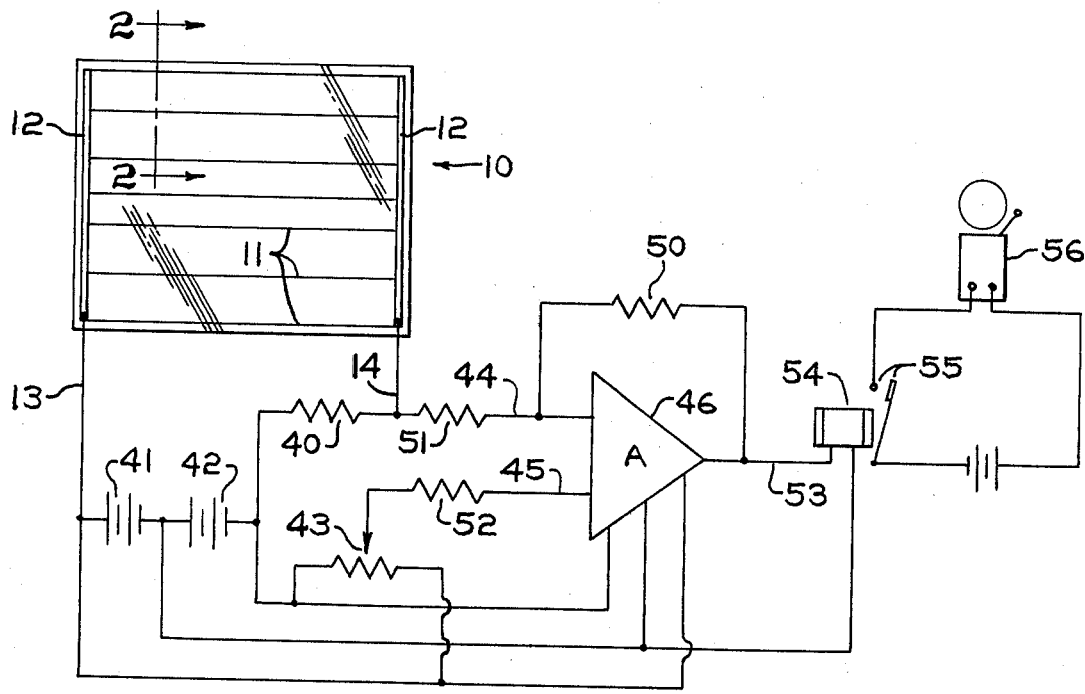
Fig.1
Fig.3
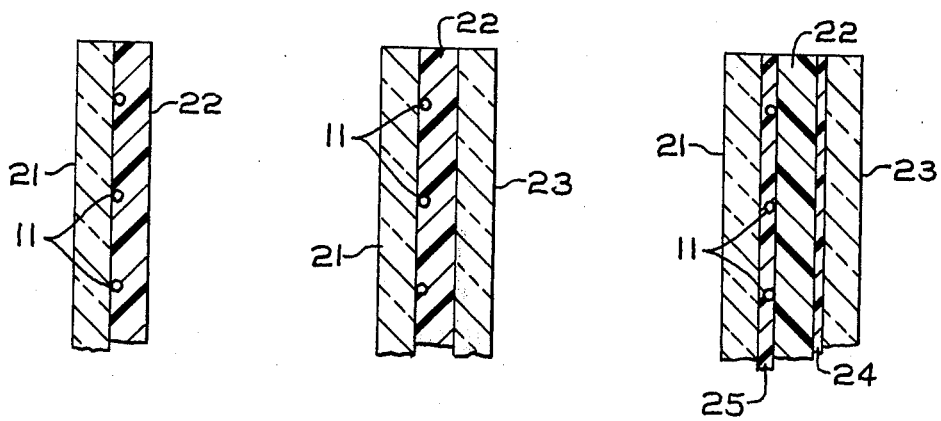
Fig.2
Fig.4

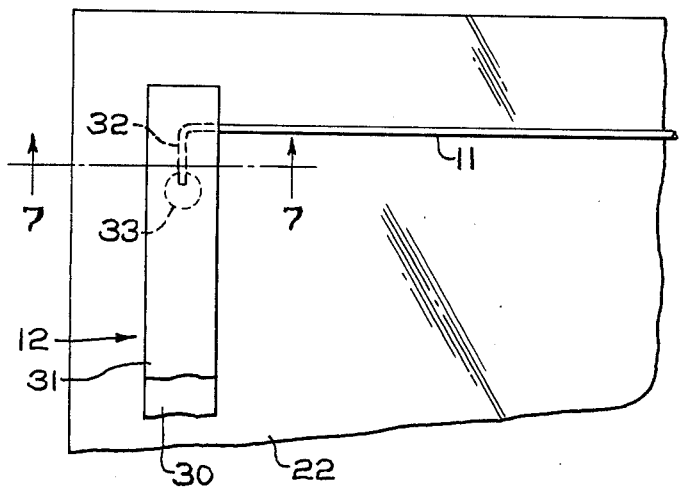
Fig.6
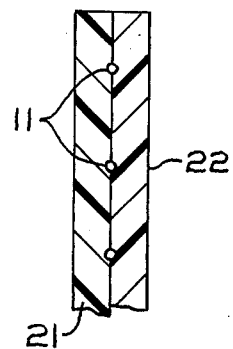
Fig.5
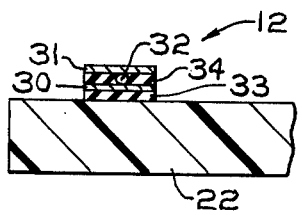
Fig.7
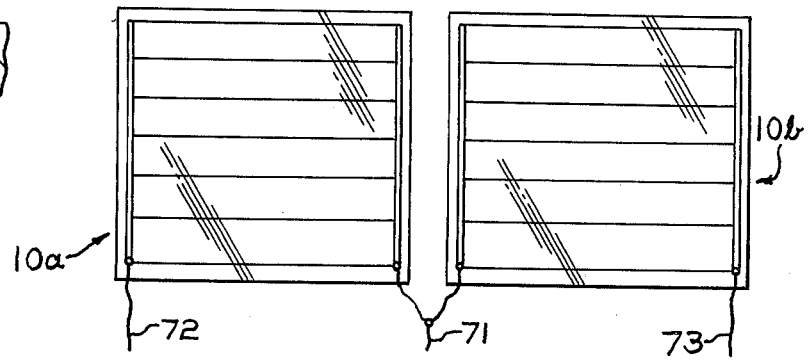
Fig.9
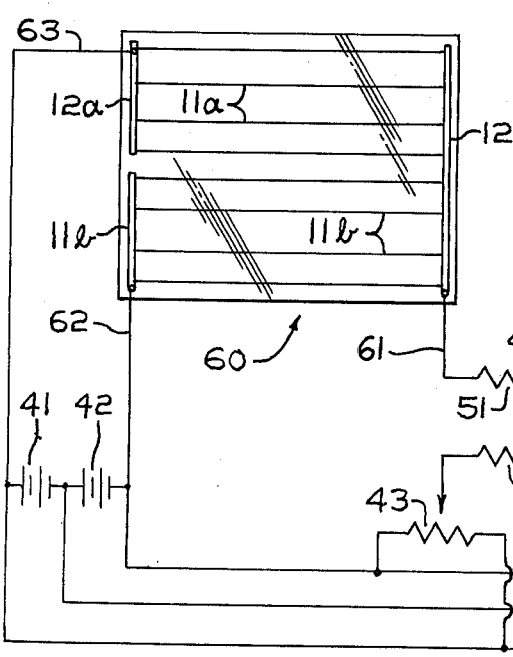
Fig.8
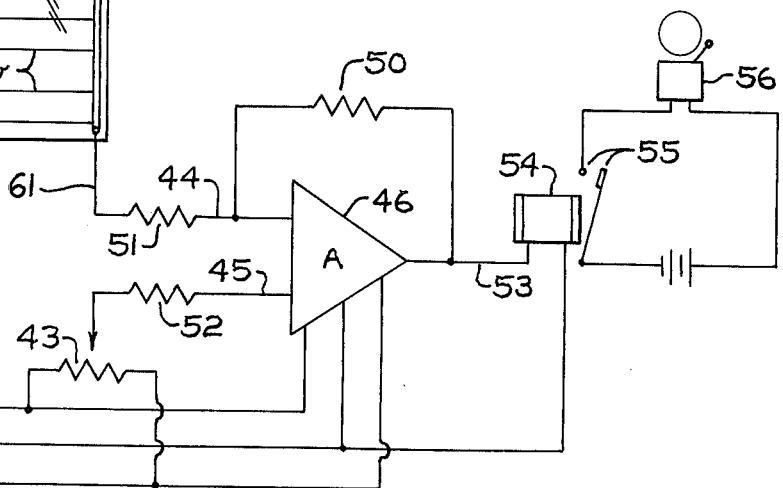

SECURITY GLAZING AND ALARM SYSTEM

BACKGROUND OF THE INVENTION

This invention relates to security glazing units and to alarm systems particularly suitable for detecting attempts to break or tamper with glazing installations. The invention may be used as a burglar alarm or as a security system in penal institutions or the like.

Security alarm systems of the prior art conventionally include a frangible conductor, such as a foil tape or thin wire, typically in a serpentine or circumscribing path, affixed to the window glazing and through which an electric current is passed. When the window is broken, the conductor also breaks, thereby opening the circuit and triggering an alarm. A typical system employing thin wires may be seen in U.S. Pat. No. 1,223,583, and a typical system employing foil tape may be seen in U.S. Pat. No. 3,409,886. Such arrangements possess certain disadvantages however. In order to keep power consumption low, the conductor can be made relatively large in width or diameter so as to reduce its resistance, but the use of such obstrusive conductors can be unsightly, particularly if the center portion of a window is to be protected. Alternatively, the path of the conductor may be shortened in order to lower the resistance of the circuit, but large areas of a window may then be left unprotected, making it possible to partially break or cut through the window without disturbing the conductor. An attempt to avoid this dilemma is shown in U.S. Pat. No. 3,441,925, where a transparent conductive coating is applied to the entire window area. This arrangement still requires a relatively large break in the window in order to register a definite change in the resistance. Small holes and cracks in the glass do not produce discrete, predictable changes in the resistance, and when laminated glazing is used in such an arrangement (as is normally required to protect the conductive coating) major gaps in the circuit are not likely to be opened without an extraordinarily forceful and wanton attack. This is especially true in the case of laminated units designed to resist penetration.

Another disadvantage of most prior art security systems is that once one of the conductors has been broken, the system cannot be reset until the damage is repaired, which can involve a considerable lapse of time, particularly if a window must be reglazed. In the meanwhile no security is provided for the window where the break occurred, even though the damage may have been caused accidentally and may be slight. A system is disclosed in U.S. Pat. No. 1,766,500 that includes two independently actuatable circuits, so that if one wire is broken, a second wire still provides security. But that arrangement requires extra electrical components and provides only minor reset capability, limited to the case of only one wire being broken. If two wires happen to be broken instead of just one, the system will be put out of commission just the same. The circuit of another prior art system, shown in U.S. Pat. No. 2,423,649, includes two resistances in parallel, but there is no suggestion therein to extend a plurality of frangible conductors across an area of entry so as to provide backup protection after an attempted breach of security. Another related circuit is shown in U.S. Pat. No. 3,138,792 in a system that does not include frangible wires.

Accordingly, there is a need for a security system that can reliably detect security breaches in the early stages and then be reset to quickly re-establish security. At the same time, it is desirable that visual aesthetics not be sacrificed in security glazing installations.

Summary of the Invention

In accordance with the present invention, laminated security glazing is provided with a resistance grid comprised of a plurality of thin, frangible conductor wires embedded in each unit. The wires extend across the face of each unit in generally parallel relationship and are affixed to bus bars at either end to create parallel electrical paths across the unit. A low voltage current is passed through the unit, and the total resistance across the unit is monitored by means of electrical circuitry connected thereto. When a wire is broken, the increase in resistance is detected by the circuit and an alarm is triggered. Subsequently, the circuit may be reset so that the resistance of the remaining unbroken portion of the grid can be monitored. In the preferred embodiments, changes in resistance are measured by comparing the resistance of one group of wires with the resistance of a second group of wires in an adjacent glazing unit or in a different portion of the same unit. A novel arrangement for resiliently attaching the fine wires to the bus bars so as to permit movement of the wires relative to the bus bars, thereby avoiding breakage due to thermal expansion, forms another aspect of the invention.

Detailed Description of the Invention

The invention will be fully understood from the following detailed description, taken together with the drawings in which:

FIG. 1 is a schematic diagram of one embodiment of the alarm system of the present invention;

FIGS. 2, 3, 4, and 5 are cross-sectional views taken along lines 2—2 in FIG. 1, showing different embodiments of the composite security glazing unit of the present invention;

FIG. 6 is an elevational view of a portion of a single ply of the inventive glazing unit prior to lamination, showing details of the bus bar connection;

FIG. 7 is a cross-sectional view of the ply portion of FIG. 6, taken along lines 7—7 in FIG. 6 showing bus bar details;

FIG. 8 is a schematic diagram of a preferred embodiment of the alarm system of the present invention which includes a glazing unit having two resistance grids; and FIG. 9 is a schematic illustration of an alternate arrangement wherein two glazing units are paired in the circuitry.

Depicted in FIG. 1 is a security glazing unit, designated generally as 10, which consists of a composite of transparent plies having a plurality of fine, conductive wires 11 forming a resistance grid sandwiched between the plies. Each wire is affixed at each end to bus bars 12 which are also placed between the plies. Electrical leads 13 and 14 are connected to the bus bars and extend beyond the edges of the glazing unit.

The structure of the glazing unit 10 may include at least one glass ply and at least one transparent plastic ply in a variety of combinations, three examples of which are illustrated in cross-section in FIGS. 2, 3, and 4. A simplified embodiment, shown in FIG. 2, is comprised of a glass ply 21 combined with a plastic ply 22. The glass may be any suitable glazing product including tempered or untempered, clear or tinted, and coated or uncoated glass. The plastic ply may be comprised of any polymeric material suitable for inclusion in a laminated transparency, such as polyvinylbutyral, polyurethane, acrylic, polyester, or polycarbonate resins. Polycarbonates are preferred because of their toughness. The plies may be bonded together using conventional laminating techniques such as autoclaving, or they may be loosely sandwiched in face-to-face relationship. Examples of the latter type of composite structure can be seen in U.S. Pat. No. 3,821,071. When laminating acrylics or polycarbonates to glass, it is usually desirable to employ an interlayer material between the plies. In the laminating process the wires 11 become embedded in the plastic ply or plies. The laminated structure is designed such that a substantially intact barrier remains even after the glass ply or plies have been broken, and such that it is improbable that all of the wires would be broken in a single attempted breach of security. The diameter and alloy of the wires will vary in accordance with the resistance requirements for each particular installation, which in turn depends upon the length of wire required to extend across a given glazing unit and the spacing of the wires. Because a plurality of wires are provided in parallel, the wires may be made so fine as to be barely visible without incurring excessive power consumption when passing a current through the unit. Copper-nickel alloy wires having a diameter of about 2 mils or less may be employed satisfactorily, but larger diameters may be used if greater visibility of the wires can be tolerated. A 3-inch space between adjacent wires is typical.

Because plastics are susceptible to scratching, it is preferred to protect the plastic with at least one glass ply. For this reason, a more practical embodiment is that shown in FIG. 3, where a second glass ply 23 is provided so as to leave no plastic surface exposed.

A preferred embodiment is depicted in FIG. 4, where two additional plastic plies 24 and 25 of an interlayer material such as polyurethane are interposed between the plastic ply 22 and the glass plies 21 and 23 to improve the bonds therebetween. In this case, laminating tends to press the wires into the interlayer material. As a specific example, the FIG. 4 embodiment may be comprised to two ¼ inch tempered glass plies, one ¼ inch polycarbonate ply, and two 0.060 inch polyurethane interlayer plies, all of which are laminated by autoclaving at 275° F. and 200 psi. Details of such a laminating process may be seen in U.S. Pat. No. 3,388,032.

It is also possible to fabricate the glazing unit from a plurality of plastic plies alone if scratch resistance is not a matter of concern. Such an embodiment is shown in FIG. 5, where two plastic plies 26 and 27, have been fused together. An interlayer of a more ductile plastic may optionally be placed between the plastic plies to form a three-layered lamination. Alternatively, the wires 11 may be pressed into one of the plastic plies and the two plies loosely retained in a face-to-face relationship by a common framing means. Plies 26 and 27 may be comprised of any rigid plastic material suitable for glazing applications. It may also be advantageous to apply coatings to the exposed plastic surfaces as is known in the art to improve their abrasion resistance.

The attachment of wires 11 to the bus bars 12 is illustrated in detail in FIGS. 6 and 7. The wires and bus bars are arranged in the desired configuration on the surface of one of the plies prior to lamination and are retained in place temporarily with adhesives until the wires are permanently embedded by the laminating process. As shown in FIGS. 6 and 7, plastic ply 22 is the substrate preferred for assembling the wires and bus bars. Similar glazing units in the automotive and aircraft fields that incorporate fine wires for defrosting purposes conventionally impress the wires onto the plastic ply in an undulatory or randomly varied pattern so as to prevent undesirable concentrations of light reflection from the wires. Since the spacing of the wires for security purposes is wider than for defrosting units, and since the requirements for optical distortion are less stringent in the case of architectural glazing than with automotive or aircraft glazing, the wires in the present invention may be laid straight across the glazing unit, thereby avoiding the complex and costly machinery used to lay defrosting wires. Each bus bar may be a composite structure built up from conductive strips 30 and 31 and adhesive layers 33 and 34 as shown in FIG. 7 (the thicknesses shown being greatly exaggerated for the sake of clarity). Strip 30 is made of a conductive material, e.g., copper foil, and may be adhered to ply 22 by means of a pressuresensitive adhesive 33. Suitable adhesive-coated foil strips are commercially available, such as "Scotch" brand tape number "X-1245" sold by the Minnesota Mining and Manufacturing Company, St. Paul, Minn., which is comprised of copper foil ⅜ inch wide and 0.0015 inch thick carrying a 0.002 inch thick layer of acrylic-based adhesive.

Referring again to FIG. 6, each wire 11 is preferably provided near its end with a bent portion 32 extending in a generally transverse direction with respect to the main body of the wire and terminating in a soldered connection 33 to strip 30 at the distal end of the bent portion. The bent portions may be on the order of ¾ inch long. The bent portions are desirable for preventing heatinduced breakage of the wires during the autoclaving step, as well as after installation, due to differing coefficients of thermal expansion within the units. Strip 31 and adhesive 34 serve to preserve the shape of the bent portions until the unit is autoclaved and provide resilient retention of the bent portion 32 between the strips. Strip 31 and adhesive 34 may be the same as that described above in connection with strip 30 and adhesive 33, but could take the form of any compatible pressure-sensitive adhesive tape, since electrical conductivity need not be required for strip 31. Adhesive 34 should be of a type that will remain deformable or become deformable when heated so as to allow some movement of the bent portions 32 between strips 30 and 31, thereby relieving thermally-induced stresses on wires 11.

It will be evident to those of skill in the art that a variety of circuit means may be employed to detect changes in the resistance grid of the security glazing unit. One suitable circuit is shown in FIG. 1, connected to glazing unit 10 by way of leads 13 and 14. A reference resistor 40 is connected in series with the resistance grid of the glazing unit, and a pair of voltage sources 41 and 42 (preferably a low voltage, on the order of about ten volts each) are connected in parallel across the grid and resistor 40. A variable voltage divider 43 is also connected in parallel across the voltage sources. A bridge circuit, including leads 44 and 45 and an amplifier 46, is wired across the tap of voltage divider 43 and the junction between the grid and reference resistor 40. Resistors 50, 51 and 52 determine the gain of amplifier 46. When the voltage divider is set to match the ratio of the grid resistance to the reference resistance 40, the circuit is balanced and no current will flow through the bridge circuit. If one or more of the wires 11 in the grid are then broken, the change in grid resistance will cause the circuit to become imbalanced and a current will pass through the bridge circuit, whereby amplifier 46 will produce an output voltage in lead 53. Output lead 53 is connected to the coil of a relay 54, so that the output voltage from the amplifier energizes the relay, causing contacts 55 to close, which in turn activates an alarm device such as a bell 56. When security has been restored, the system can be quickly and easily reset by merely adjusting voltage divider 43 so as to again match the ratio of the resistance of the unbroken portion of the grid to the reference resistance.

Referring now to FIG. 8, there is shown a preferred embodiment wherein a glazing unit 60, otherwise having the same laminated structure as any of the previously described embodiments, is provided with two electrically independent grids of wires 11a and 11b. The wires are connected at one side to a bus bar 12 as in the embodiment of FIG. 1, but along the opposite side two separate bus bars 12a and 12b are provided. Three leads 61, 62 and 63 extending from the glazing unit are connected to the bus bars. The resistance-monitoring circuitry is identical to that of FIG. 1 except that reference resistor 40 has been omitted and grid 11b has been substituted in place thereof. Thus the resistance of each grid is measured against the resistance of the other grid and an unequal change in either grid will trigger the alarm. Because the wires grids are embedded in a tough plastic ply, it is highly improbable that the same number of wires could be severed in both grids at the same moment. Not only does this arrangement avoid the need for a separate reference resistor for each glazing unit, but it also prevents false alarms stemming from resistance changes that can be caused by temperature fluctuations. Since both grids are exposed to essentially the same ambient temperature conditions, any resulting change in resistance is the same in both grids, and therefore the sensing circuit remains balanced.

A variation of the two-grid arrangement is shown in FIG. 9, where two separate adjacent glazing units 10a and 10b, each the same as unit 10 in FIG. 1, are connected in series so as to be the equivalent of the two-grid single unit in FIG. 8. Leads 71, 72 and 73 may be connected to the FIG. 8 circuit in place of leads 61, 62 and 63, respectively.

Although the description of the invention has heretofore dealt specifically with window glazing units made from glass and transparent plastics, it should be apparent that the inventive security system may be associated with opaque materials as well for use as wall panels, doors, and the like. Other modifications and variations as are known to those of skill in the art may be resorted to without departing from the spirit and scope of the invention as defined by the appended claims.

I claim:
1. A security glazing system comprising:
a resistance grid formed by a plurality of frangible, electrically conductive wires electrically in parallel with one another and extending across an area to be protected;
means for applying a voltage across said grid; and
circuit means connected across said grid, including resistance balancing means for comparing the resistance of said grid with a reference resistance and for generating an output signal in response to an incremental change in the grid resistance corresponding to a break in one or more of said wires in the grid, said resistance balancing means being provided with adjustment means for resetting the system by re-establishing a resistance balance in the circuit while a portion of the grid wires are broken.

2. The security system of claim 1 wherein said area to be protected is a transparent glazing installation.

3. The security system of claim 2 wherein said glazing includes a plurality of plies, at least one of said plies being plastic, and said grid being sandwiched between said plies.

4. The security system of claim 3 wherein said glazing includes at least one glass ply, and said grid is embedded in one of said plastic plies.

5. The security system of claim 4 wherein at least one of said plastic plies is polycarbonate.

6. The security system of claim 5 wherein said glazing includes a polycarbonate ply laminated between two glass plies, with a ply of plastic interlayer material between each pair of plies.

7. The security system of claim 1 wherein the ends of said wires are connected to bus bars and each of said bus bars includes a first strip overlying a second strip, and each of said connections includes a bent portion in one of said wires, said bent portion lying between said first and said second strips with a distal end of each bent portion affixed to one of said strips and the remainder of said bent portion resiliently retained between said strips.

8. A security system comprising:
a first resistance grid and a second resistance grid, each formed by a plurality of frangible, electrically conductive wires electrically in parallel with one another, each grid extending across a respective area to be protected;
means for applying voltages across said grids; and
circuit means connected across each of said grids, including resistance balancing means for comparing the resistance of said first grid with the resistance of said second grid and for generating an output signal in response to an incremental change in the resistance of one of said grids corresponding to a break in one or more of said wires in the grid, said resistance balancing means being provided with adjustment means for resetting the system by re-establishing a resistance balance in the circuit while a portion of the grid wires are broken.

9. The security system of claim 8 wherein said first and second grids extend across first and second areas, respectively, of a glazing unit.

10. The security system of claim 8 wherein said first grid extends across a first glazing unit, and said second grid extends across a second glazing unit.

11. A composite glazing unit comprising:
at least two transparent plies, one superimposed over the other;
bus bar means between said plies along opposite edge portions of the unit, each bus bar means including two strips, one strip overlying the other strip, at least one of said strips being electroconductive;
a plurality of frangible, electrically conductive wires between said plies, each wire connected at each of its ends to one of said bus bar means so as to place said wires electrically in parallel to each other, each wire terminating in a bent portion lying between said strips, said bent portions being resiliently retained between said strips so as to permit movement of said wires relative to said bus bar means.

12. The glazing unit of claim 11 wherein at least one of said plies is glass and another of said plies is a plastic, and said wires are imbedded in said plastic ply.

13. The glazing unit of claim 12 wherein said plies are laminated together.

14. The glazing unit of claim 13 wherein said plastic ply is polycarbonate.

15. The glazing unit of claim 11 wherein a layer of deformable adhesive is provided between said bus bar strips so as to resiliently retain said bent portions of said wires.

* * * * *